US011640230B2

(12) United States Patent
Christie et al.

(10) Patent No.: US 11,640,230 B2
(45) Date of Patent: May 2, 2023

(54) WEIGHTED SUPPLY CHAIN CORPORATE HIERARCHY INTERFACE

(71) Applicant: S&P Global Inc., New York, NY (US)

(72) Inventors: Robert George Christie, Somerville, MA (US); Jonathan Edward Hoyt Hayden, Westford, MA (US); Michael Albert Vezza, Weston, MA (US); James Ryan Psota, Cambridge, MA (US)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 17/449,355

(22) Filed: Sep. 29, 2021

(65) Prior Publication Data

US 2023/0102524 A1    Mar. 30, 2023

(51) Int. Cl.
  *G06F 16/22*    (2019.01)
  *G06F 3/0482*    (2013.01)
  *G06Q 30/0201*    (2023.01)
  *G06F 3/0484*    (2022.01)
  *G06F 16/248*    (2019.01)

(52) U.S. Cl.
  CPC .......... *G06F 3/0482* (2013.01); *G06F 3/0484* (2013.01); *G06F 16/2246* (2019.01); *G06F 16/248* (2019.01); *G06Q 30/0201* (2013.01)

(58) Field of Classification Search
  CPC .. G06F 3/0482; G06F 16/2246; G06F 16/248; G06F 3/0484; G06Q 30/0201
  See application file for complete search history.

(56) References Cited

U.S. PATENT DOCUMENTS

| | | | | |
|---|---|---|---|---|
| 8,674,993 | B1* | 3/2014 | Fleming | G06Q 40/06 707/794 |
| 8,892,989 | B1* | 11/2014 | Lieb | G06F 3/01 715/205 |
| 11,144,994 | B1* | 10/2021 | Hazelton | G06Q 40/06 |
| 2015/0052441 | A1* | 2/2015 | Degioanni | H04L 41/145 715/734 |
| 2016/0260063 | A1* | 9/2016 | Harris | G06Q 10/105 |
| 2020/0201584 | A1* | 6/2020 | Xu | G06F 3/125 |
| 2020/0279190 | A1* | 9/2020 | Kitajima | G06F 16/285 |
| 2021/0111962 | A1* | 4/2021 | Todd | G06F 9/451 |
| 2021/0133015 | A1* | 5/2021 | Agarwal | G06F 11/36 |
| 2021/0342785 | A1* | 11/2021 | Mann | G06Q 10/06312 |

* cited by examiner

*Primary Examiner* — Beau D Spratt
(74) *Attorney, Agent, or Firm* — Yee & Associates, P.C.

(57) ABSTRACT

A method for visualizing corporate hierarchies is provided. The method comprises receiving a selection of a first company stored in a database and retrieving, from the database, an ultimate parent company of the first company. All other known companies with the same ultimate parent company as the first company are then retrieved from the database. An interactive hierarchical tree diagram is displayed in an interface, wherein the first company, the ultimate parent company, and the other known companies with the same ultimate parent company are displayed as nodes according to parent/child relationships among the companies. Also displayed in the interface, adjacent to the tree diagram, is a collapsible nested tree list comprising the first company, the ultimate parent company, and the other known companies with the same ultimate parent company. The tree diagram and nested tree list have synchronized responses to user input.

28 Claims, 8 Drawing Sheets

WEIGHTED SUPPLY CHAIN CORPORATE HIERARCHY INTERFACE

BACKGROUND INFORMATION

1. Field

The present disclosure relates generally to an improved computing system, and more specifically to a method of visualizing corporate hierarchies within supply chains.

2. Background

In supply chain management, large companies may operate through a number of subsidiaries. These subsidiaries may have names that differ from that of the corporate parent, often as variants of the parent name. However, some subsidiary names may differ considerably from that of the corporate parent.

Therefore, it would be desirable to have a method and apparatus that take into account at least some of the issues discussed above, as well as other possible issues.

SUMMARY

An illustrative embodiment provides a computer-implemented method for visualizing corporate hierarchies. The method comprises receiving a selection of a first company stored in a database and retrieving, from the database, an ultimate parent company of the first company. All other known companies with the same ultimate parent company as the first company are then retrieved from the database. An interactive hierarchical tree diagram is displayed in an interface, wherein the first company, the ultimate parent company, and the other known companies with the same ultimate parent company are displayed as nodes according to parent/child relationships among the companies. Also displayed in the interface, adjacent to the tree diagram, is a collapsible nested tree list comprising the first company, the ultimate parent company, and the other known companies with the same ultimate parent company according to the parent/child relationships among the companies. The tree diagram and nested tree list have synchronized responses to user input.

Another illustrative embodiment provides a system for visualizing corporate hierarchies. The system comprises a storage device configured to store program instructions and one or more processors operably connected to the storage device and configured to execute the program instructions to cause the system to: receive a selection of a first company stored in a database; retrieve, from the database, an ultimate parent company of the first company; retrieve, from the database, all other known companies with the same ultimate parent company as the first company; display, in an interface, an interactive hierarchical tree diagram, wherein the first company, the ultimate parent company, and the other known companies with the same ultimate parent company are displayed as nodes according to parent/child relationships among the companies; and display, in the interface, adjacent to the tree diagram, a collapsible nested tree list comprising the first company, the ultimate parent company, and the other known companies with the same ultimate parent company according to the parent/child relationships among the companies, wherein the tree diagram and nested tree list have synchronized responses to user input.

Another illustrative embodiment provides a computer program product for visualizing corporate hierarchies. The computer program product comprises a computer-readable storage medium having program instructions embodied thereon to perform the steps of: receiving a selection of a first company stored in a database; retrieving, from the database, an ultimate parent company of the first company; retrieving, from the database, all other known companies with the same ultimate parent company as the first company; displaying, in an interface, an interactive hierarchical tree diagram, wherein the first company, the ultimate parent company, and the other known companies with the same ultimate parent company are displayed as nodes according to parent/child relationships among the companies; and displaying, in the interface, adjacent to the tree diagram, a collapsible nested tree list comprising the first company, the ultimate parent company, and the other known companies with the same ultimate parent company according to the parent/child relationships among the companies, wherein the tree diagram and nested tree list have synchronized responses to user input.

Another illustrative embodiment provides a computer-implemented method for visualizing corporate hierarchies. The method comprises receiving a selection of a profile company stored in a database and retrieving, from the database, an ultimate parent company of the profile company. All other known companies with the same ultimate parent company as the profile company are also retrieved from the database. An interactive hierarchical tree diagram is displayed in an interface with the ultimate parent company as the root of the tree diagram. The profile company and other companies are displayed as child nodes in the tree diagram, wherein the profile company is highlighted. Node sizes are determined by numbers of shipments associated with each company. A collapsible nested tree list is displayed adjacent to the tree diagram in the interface. The ultimate parent company is at the top, and the profile company and other companies are nested according to parent/child relationships among the companies. The tree diagram and nested tree list have synchronized responses to user input.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that corporate subsidiaries do not necessarily have names that are similar to those of their corporate parents.

The illustrative embodiments also recognize and take into account that differences in corporate parent and subsidiary names can pose a challenge for supply chain management and determining total corporate family participation in a supply chain. For example, several small companies might be known buyers or suppliers within a supply chain. However, a number of them might in fact be subsidiaries of a common parent company.

The illustrative embodiments a visualization of a corporate family in relation to supply chain data. For a given company, companies within the same corporate family are displayed in both an interactive hierarchical tree diagram and nested tree list according to parent/child relationships. Nodes representing the companies can be sized according to a number of shipments associated with the companies.

The illustrative embodiments enable better visualization of the operation of corporate hierarchies within supply chains. For example, the illustrative embodiments can be used to investigate how large companies move goods among their subsidiaries, providing insight into internal supply chains. Another example, the illustrative embodiments may be used by suppliers or manufacturers to identify corporate parents of customers, creating the opportunity to expand business with the corporate family.

Figure 1:
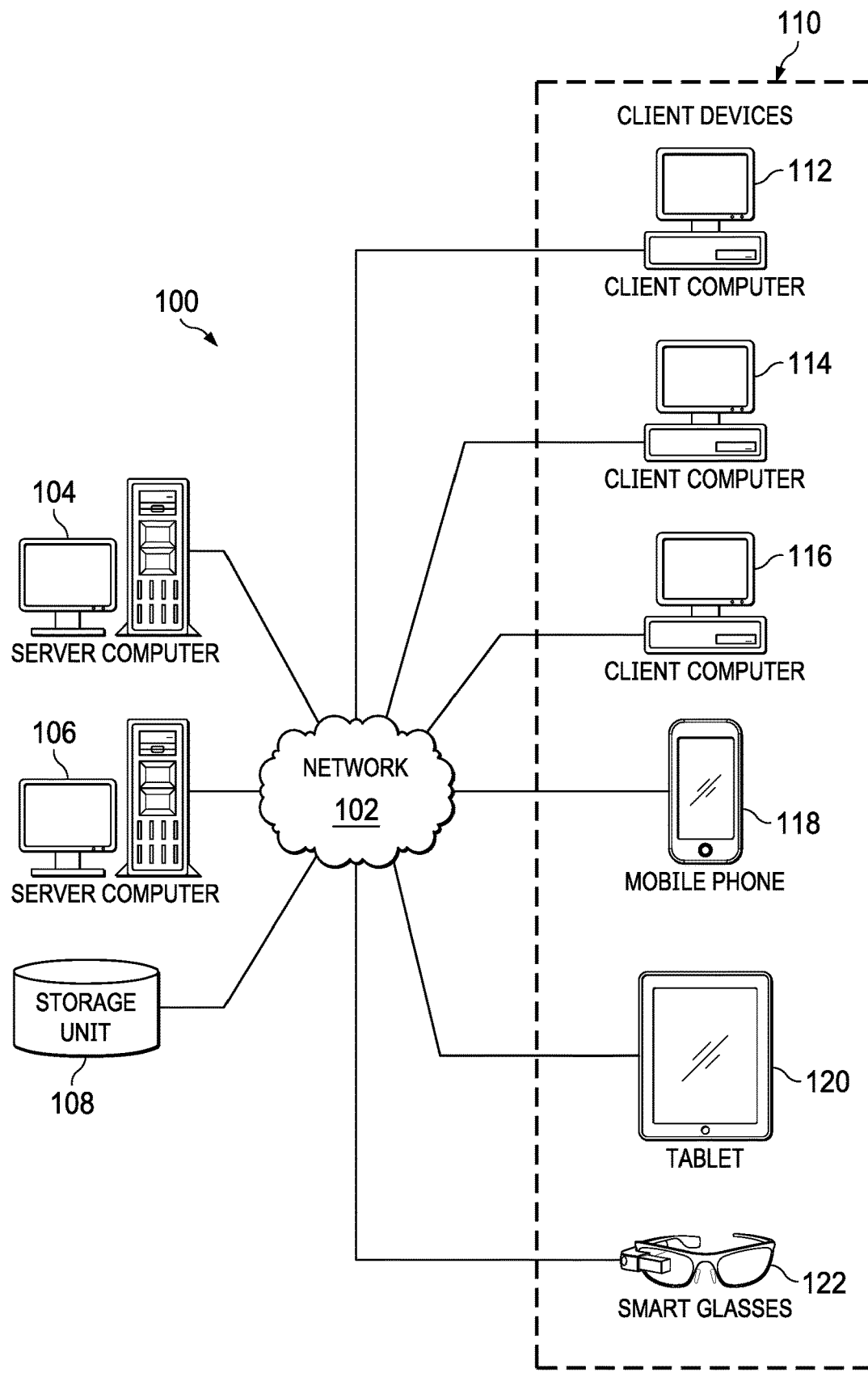
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
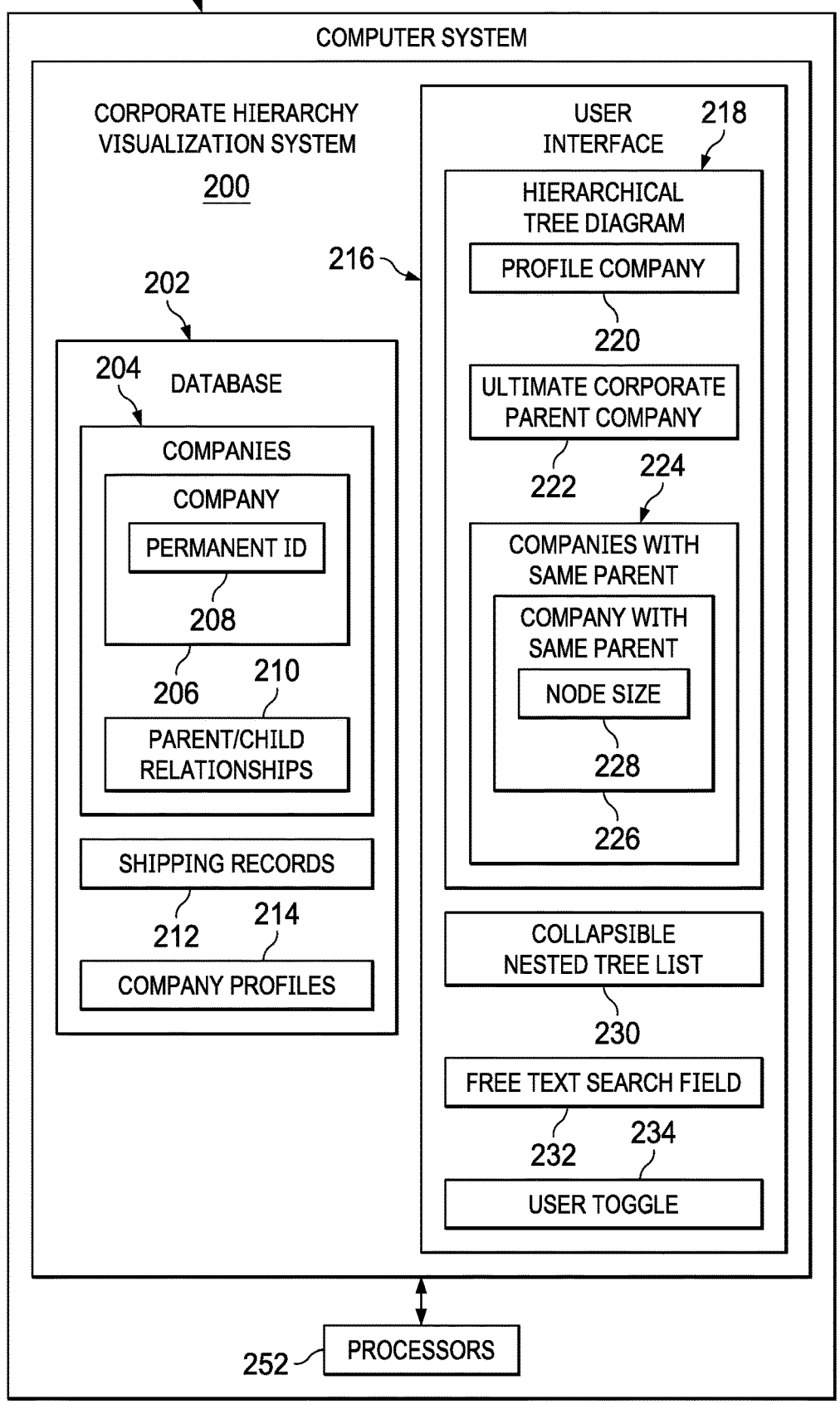
FIG. 2 is a block diagram of a corporate hierarchy visualization system depicted in accordance with an illustrative embodiment.

FIG. 2 is a block diagram of a corporate hierarchy visualization system depicted in accordance with an illustrative embodiment. Corporate hierarchy visualization system 200 might be implemented in network data processing system 100 in FIG. 1.

Corporate hierarchy visualization system 200 comprises a database 202 of companies 204. Each company 206 has a unique permanent ID 208 associated with it. Database 202 also includes information about respective parent/child relationships 210 among companies 204.

Database 202 contains a number of shipping records 212 associated with companies 204. Shipping records 212 record the number of shipments, if any, a company within a corporate hierarchy has made within a specified time frame as either a buyer or seller.

Company profiles 214 that summarize the identities and shipping activities of companies 204 are also stored in database 202.

Corporate hierarchy visualization system 200 comprises a user interface 216 that displays a corporate hierarchy tree diagram 218 in response to a user search of a profile company 220. In response to a user selection of a profile company 222 from database 202, corporate hierarchy visualization system 200 identifies an ultimate corporate parent company 222 of profile company 220. An ultimate corporate parent is a company that has subsidiaries (which in turn may have more subsidiaries) but is not itself a subsidiary of another company.

Corporate hierarchy visualization system 200 also identifies other companies 224 with the same ultimate corporate parent company 222 as profile company 220. The profile company 220, ultimate corporate parent company 222, and other companies 224 with the same ultimate corporate parent company are displayed as nodes in hierarchical tree diagram 218. Each company 226 with the same parent in hierarchical tree diagram 218 has a corresponding node size 228 based on the number of shipments associated with that company in shipping records 212.

User interface 216 also comprises a collapsible nested tree list 230 that corresponds to hierarchical tree diagram 218. (See FIG. 3). Hierarchical tree diagram 218 and nested tree list 230 may be linked to have synchronized responses to user input.

User interface 216 may also include a free text search field 232 in which a user can enter specific search terms, which causes both the hierarchical tree diagram 218 and nested tree list 230 to show only those companies that conform to the search terms. (See FIG. 6).

User interface 216 may also comprise a user toggle 234 that allows the user to exclude nodes without supply chain data in shipping records 212.

Corporate hierarchy visualization system 200 can be implemented in software, hardware, firmware, or a combination thereof. When software is used, the operations performed by corporate hierarchy visualization system 200 can be implemented in program code configured to run on hardware, such as a processor unit. When firmware is used, the operations performed by corporate hierarchy visualization system 200 can be implemented in program code and data and stored in persistent memory to run on a processor unit. When hardware is employed, the hardware may include circuits that operate to perform the operations in corporate hierarchy visualization system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for corporate hierarchy visualization system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, corporate hierarchy visualization system 200 can run on one or more processors 252 in computer system 250. As used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Figure 3:
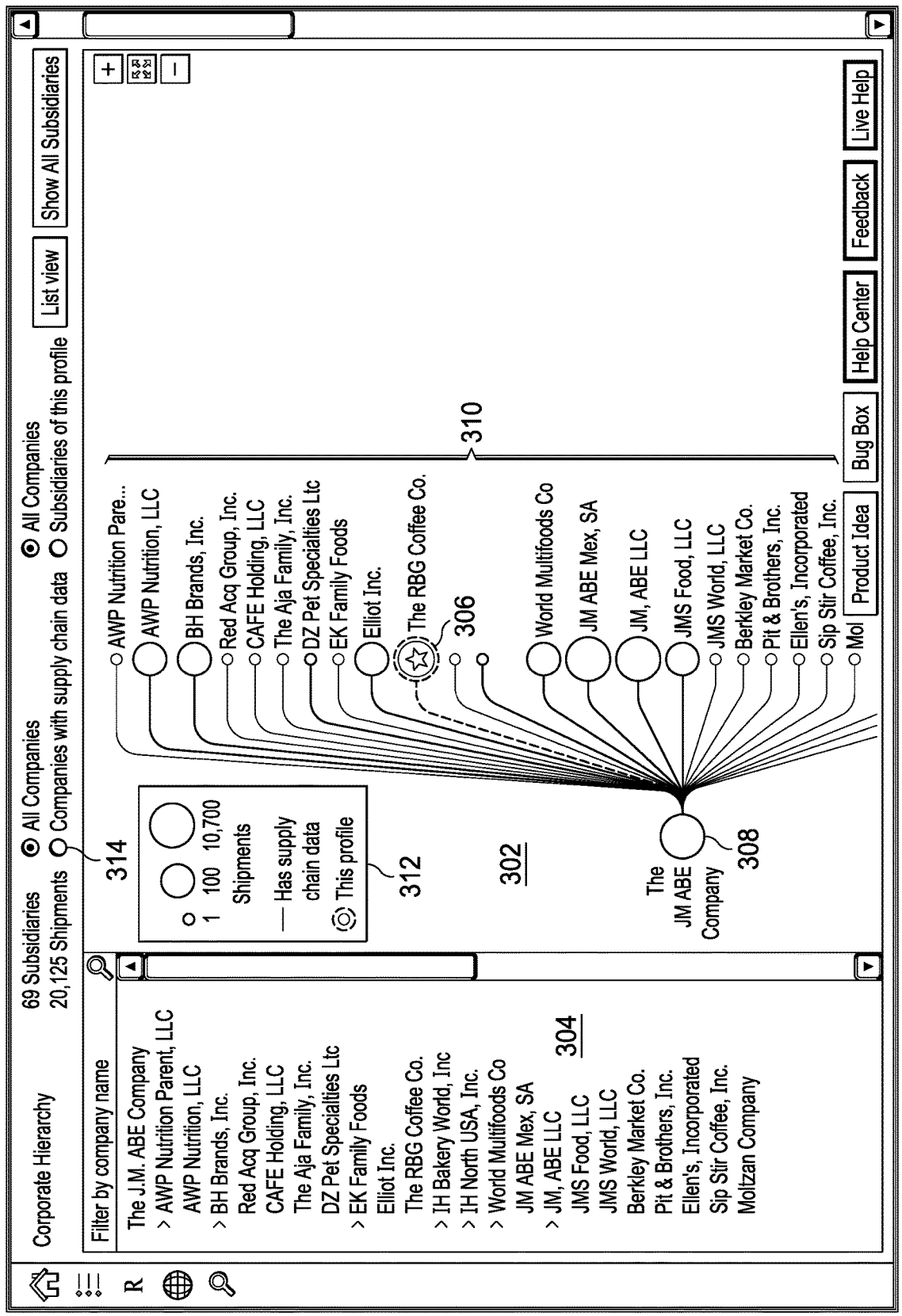
FIG. 3 illustrates a corporate hierarchy visualization interface in accordance with an illustrative embodiment.

FIG. 3 illustrates a corporate hierarchy visualization interface in accordance with an illustrative embodiment. Interface 300 might be an example of user interface 216 in FIG. 2.

Interface 300 comprises interactive hierarchical tree diagram 302 and adjacent nested tree list 304. Interactive hierarchical tree diagram 302 is constructed relative to profile company 306 selected by a user, which is highlighted in hierarchical tree diagram 302.

The ultimate corporate parent company 308 for profile company forms the root node of hierarchical tree diagram 302. Nodes 310 representing other companies that share the same ultimate corporate parent company 308 as profile company 306 form the other branches of the tree diagram 302. The size of nodes 310 may be determined according to the number of shipments associated with them, as denoted by key 312. User toggle 314 may be used to limit hierarchical tree diagram 302 to only companies with supply chain data.

Nested tree list 304 includes the same companies shown in hierarchical tree diagram 302, with the ultimate corporate parent company 308 at the top of the nested tree list and the profile company 306 and other companies represented by nodes 310 nested according to the parent/child relationships.

Figure 4:
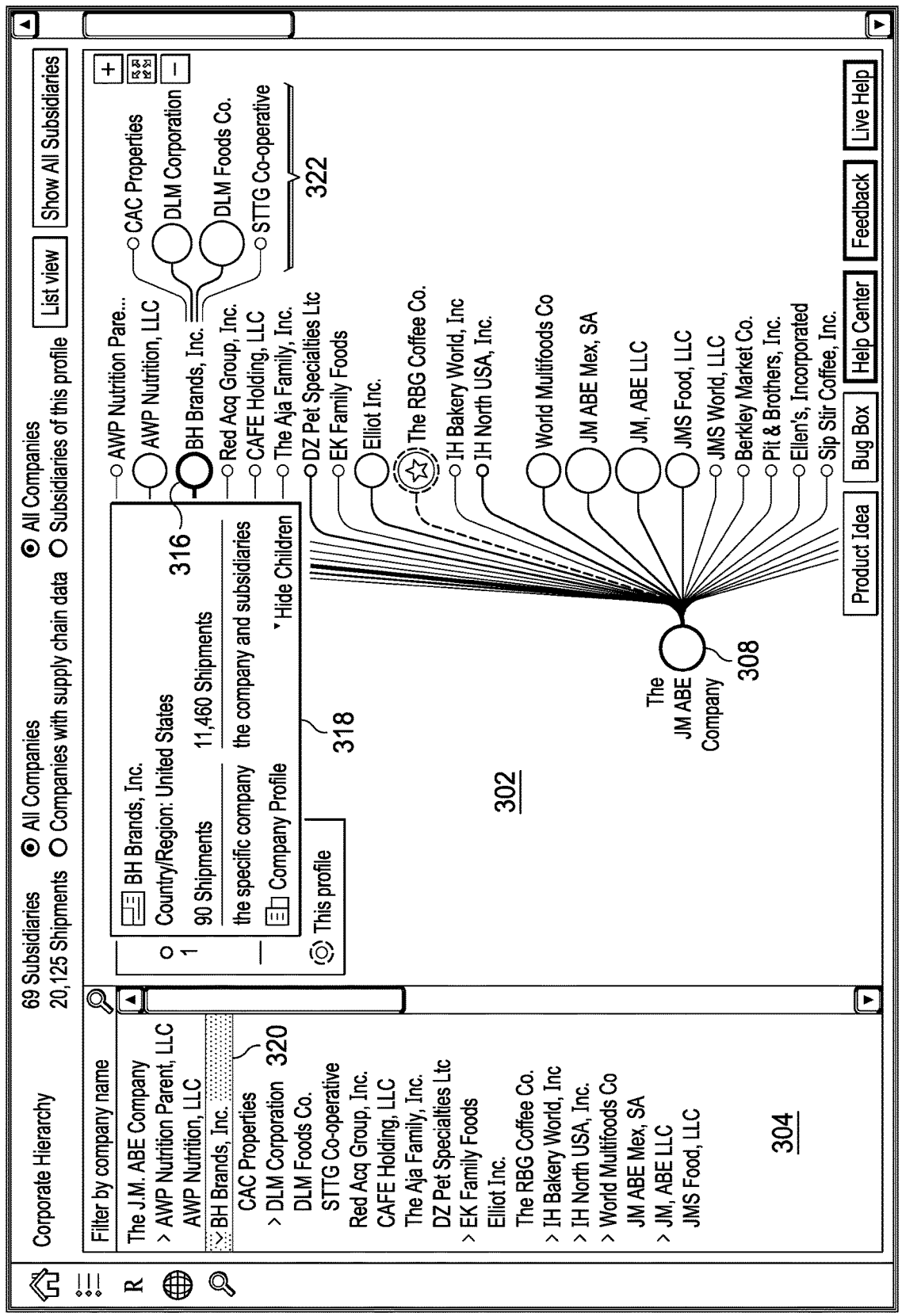
FIG. 4 illustrates the display of expanded corporate information in the corporate hierarchy visualization interface in accordance with an illustrative embodiment.

FIG. 4 illustrates the display of expanded corporate information in the corporate hierarchy visualization interface 300 in accordance with an illustrative embodiment. In response to a cursor hovering over a node 316 of a specific company in the tree diagram 302, interface 300 highlights a path from the node to the ultimate parent company 308. Hovering a cursor over the node 316 may also cause interface 300 to display a pop-up window 318 with company details. The company details may comprise at least one of company name, country of operation, number of shipments, and a link to a company profile in the database. Hovering a cursor over the node 316 may also expand tree diagram 302 to display subsidiaries 322 of the selected company/node 316.

Because hierarchical tree diagram 302 and nested tree list 304 are synchronized selection of a company 320 in the nest tree list also highlights the selected company 316 in the tree diagram 302, and selection of a company 316 in the tree diagram also highlights the selected company 320 in the nested tree list 304.

Figure 5:
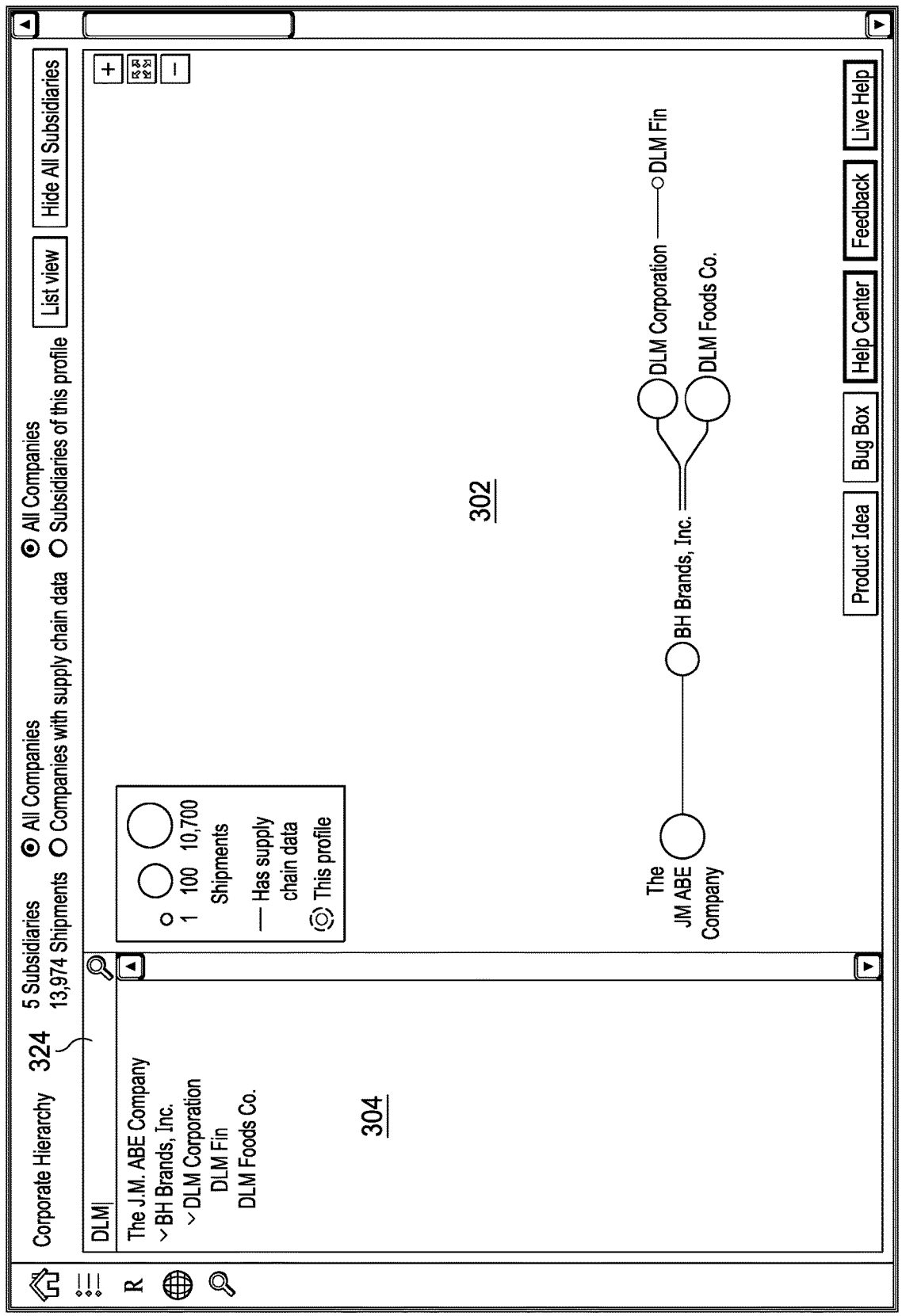
FIG. 5 illustrates a keyword search in the corporate hierarchy visualization interface in accordance with an illustrative embodiment.

FIG. 5 illustrates a keyword search in the corporate hierarchy visualization interface in accordance with an illustrative embodiment. In response to entry of a text in free text search field 324, the interface 300 reduces the hierarchical tree diagram 302 and collapsible nested tree list 304 to display only subsidiaries related to the entered text.

Figure 6:
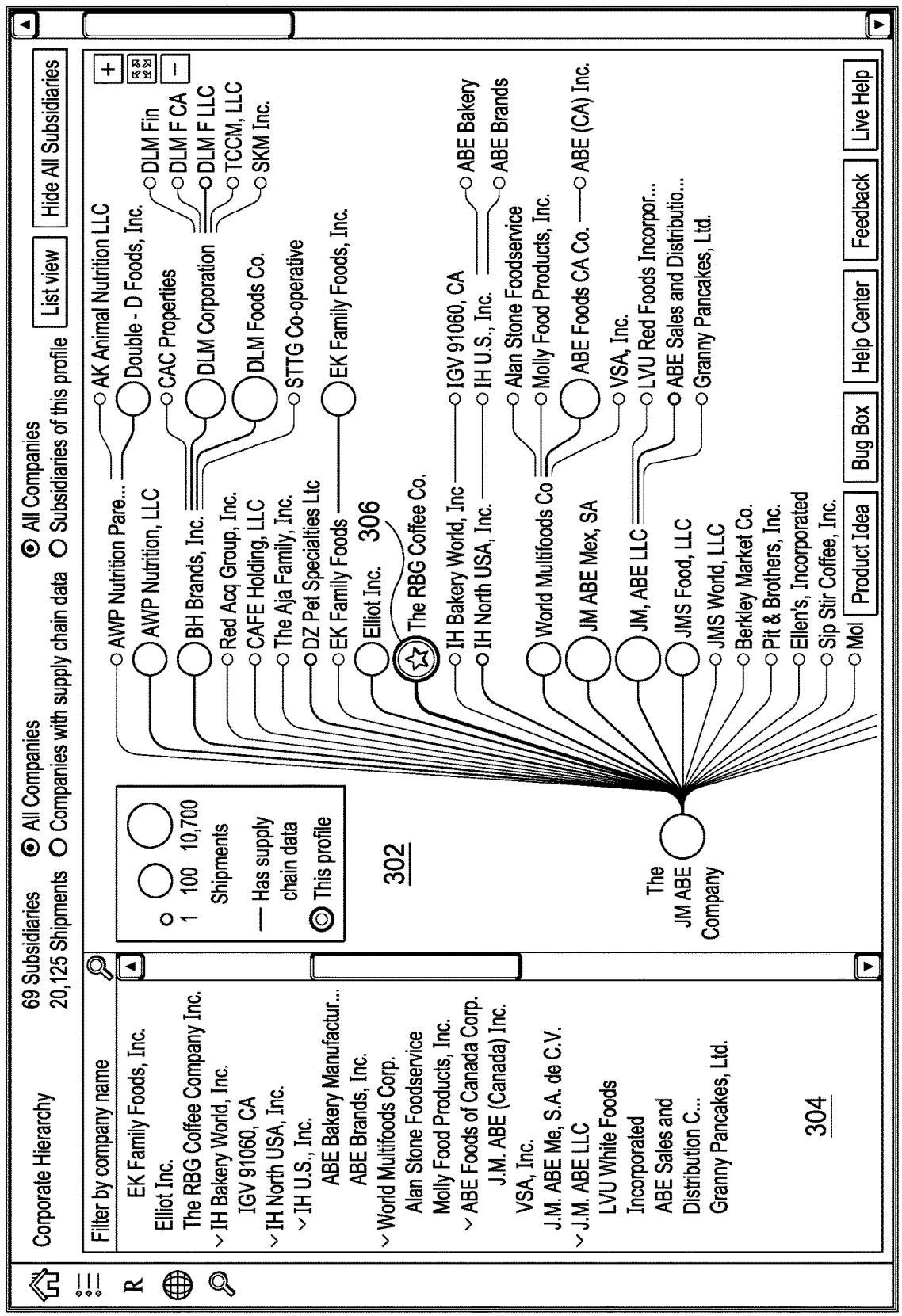
FIG. 6 illustrates the corporate hierarchy visualization interface 300 with a fully expanded view in accordance with an illustrative embodiment.

FIG. 6 illustrates the corporate hierarchy visualization interface 300 with a fully expanded view in accordance with an illustrative embodiment. In this alternate view, both tree diagram 302 and nested list 304 display all subsidiaries within the corporate family of profile company 306.

Figure 7:
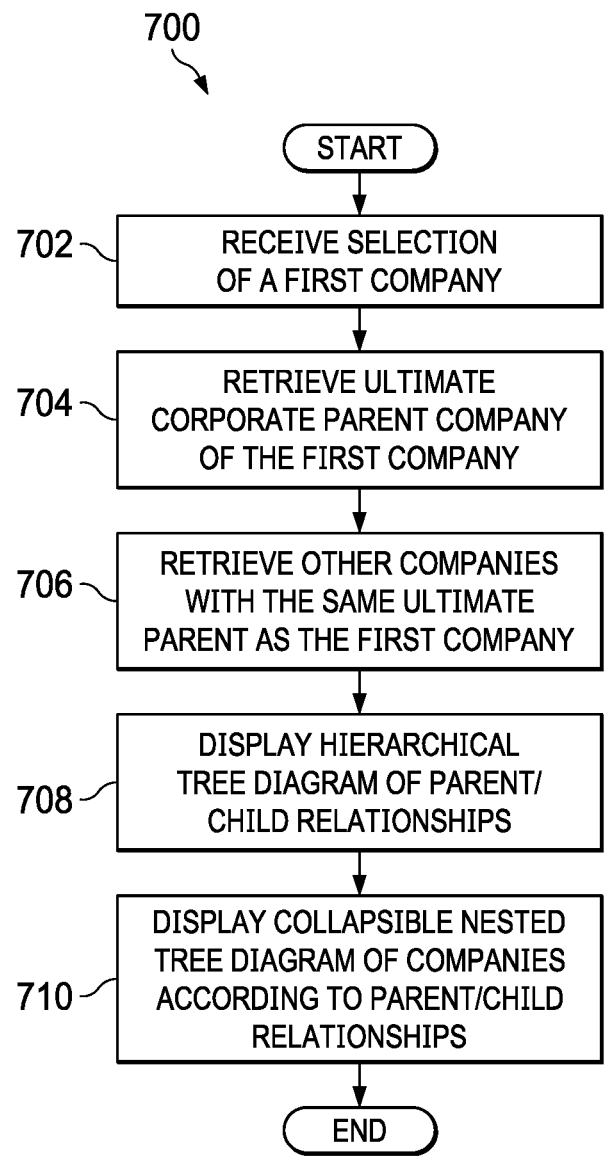
FIG. 7 depicts a flowchart illustrating a process for visualizing corporate hierarchies in accordance with an illustrative embodiment.

FIG. 7 depicts a flowchart illustrating a process for visualizing corporate hierarchies in accordance with an illustrative embodiment. Process 700 can be implemented in hardware, software, or both. When implemented in software, the process can take the form of program code that is run by one of more processor units located in one or more hardware devices in one or more computer systems. Process 700 might be implemented in corporate hierarchy visualization system 200 in FIG. 2.

Process 700 begins by receiving a selection of a first company stored in a database (step 702).

Process 700 retrieves the ultimate parent company of the first company from the database (step 704).

Process 700 retrieves from the database all other known companies with the same ultimate parent company as the first company (step 706).

An interactive hierarchical tree diagram is then displayed in an interface, wherein the first company, the ultimate parent company, and the other known companies with the same ultimate parent company are displayed as nodes according to parent/child relationships among the companies (step 708). The nodes may be sized according to a number of shipping records associated with each node in the database. The interface may also comprise a user toggle to exclude nodes that do not have supply chain data in the database.

Process 700 also displays in the interface, adjacent to the tree diagram, a collapsible nested tree list comprising the first company, the ultimate parent company, and the other known companies with the same ultimate parent company (step 710). The tree diagram and nested tree list have synchronized responses to user input such that a user interaction with one will produce a concurrent mirrored response by the other. Therefore, selection of a company in the nest tree list highlights the selected company in the tree diagram, and selection of a company in the tree diagram highlights the selected company in the nested tree list.

The interface may further comprise a free text search field, and wherein, in response to entry of a company in the free text search field, the interface reduces the hierarchical tree diagram and collapsible nested tree list to display only the entered company and its parent companies.

Process 700 then ends.

Figure 8:
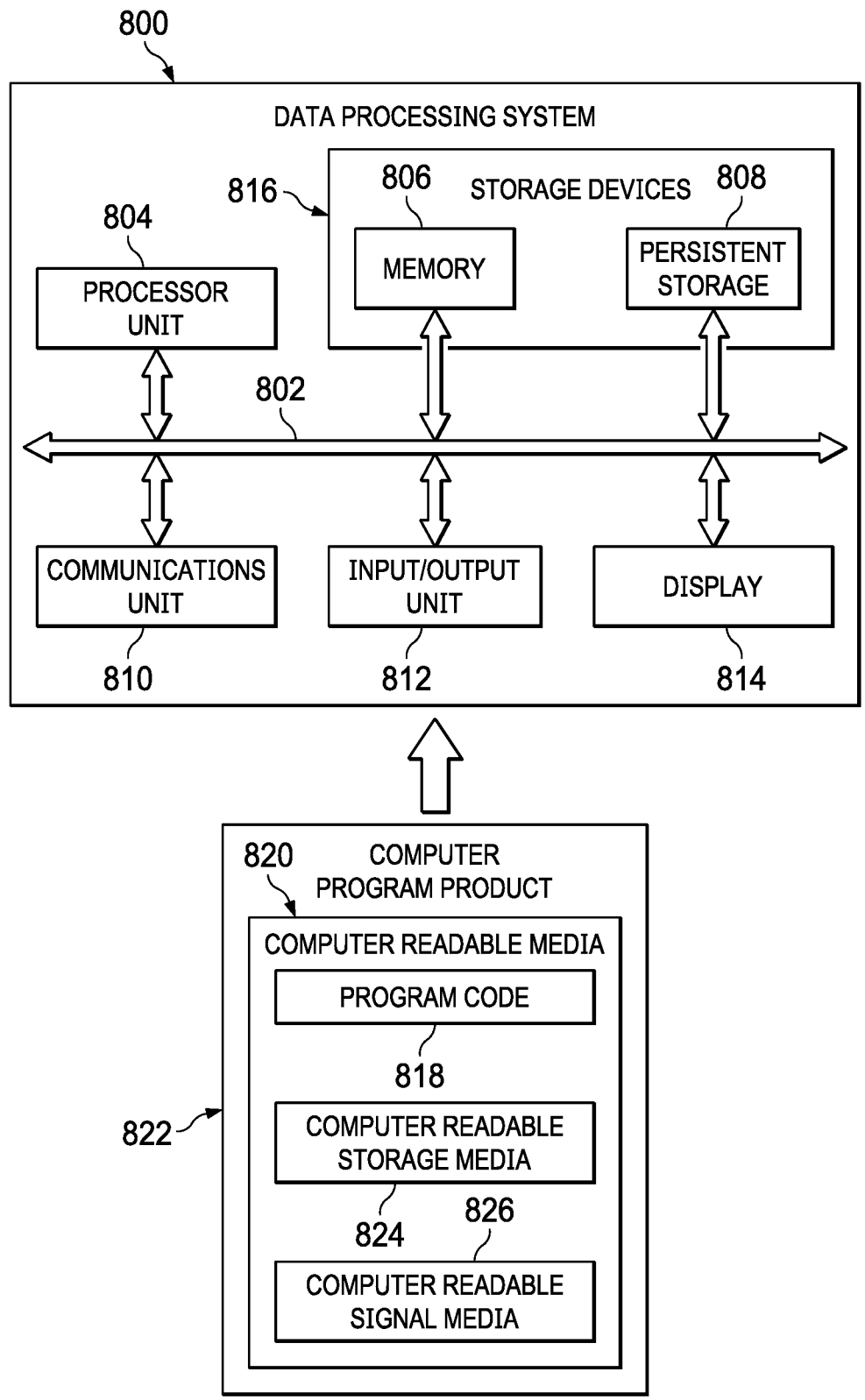
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computers 104 and 106 and client devices 110 in FIG. 1, as well as computer system 250 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for visualizing corporate hierarchies, the method comprising:
   using a number of processors to perform the steps of:
      receiving a selection of a first company stored in a database;
      retrieving, from the database, an ultimate parent company of the first company;
      retrieving, from the database, all other known companies with the same ultimate parent company as the first company, wherein the ultimate parent company, the first company, and the other known companies form a corporate hierarchy;
      displaying, in an interface, an interactive hierarchical tree diagram, wherein the first company, the ultimate parent company, and the other known companies with the same ultimate parent company are displayed as nodes according to parent/child relationships among companies within the corporate hierarchy, wherein each node is sized according to a number of shipping records associated with each company of the corporate hierarchy within a specified time frame; and
      displaying, in the interface, adjacent to the tree diagram, a collapsible nested tree list comprising the first company, the ultimate parent company, and the other known companies with the same ultimate parent company according to the parent/child relationships among the companies, wherein the tree diagram and nested tree list have synchronized responses to user input.

2. The method of claim 1, wherein the nodes of the tree diagram provide a visualization of corporate hierarchy in relation to a supply chain within the corporate hierarchy.

3. The method of claim 1, wherein the interface further comprises a user toggle to exclude nodes that do not have supply chain data in the database.

4. The method of claim 1, wherein the interface further comprises a free text search field, and wherein, in response to entry of text in the free text search field, the interface reduces the hierarchical tree diagram and collapsible nested tree list to display only subsidiaries related to the text.

5. The method of claim 1, wherein selection of a company in the nest tree list highlights the selected company in the tree diagram, and selection of a company in the tree diagram highlights the selected company in the nested tree list.

6. The method of claim 1, further comprising, in response to a cursor hovering over a node in the tree diagram, highlighting a path from the node to the ultimate parent company.

7. The method of claim 1, further comprising, in response to a cursor hovering over a node in the tree diagram, displaying a pop-up window with company details.

8. The method of claim 7, wherein the company details comprise at least one of:
company name;
country of operation;
number of shipments; or
a link to a company profile in the database.

9. The method of claim 1, further comprising, in response to a user clicking a node in the tree diagram, expanding a hierarchy sub-branch from the node.

10. A system for visualizing corporate hierarchies, the system comprising:
a storage device configured to store program instructions; and
one or more processors operably connected to the storage device and configured to execute the program instructions to cause the system to:
receive a selection of a first company stored in a database;
retrieve, from the database, an ultimate parent company of the first company;
retrieve, from the database, all other known companies with the same ultimate parent company as the first company, wherein the ultimate parent company, the first company, and the other known companies form a corporate hierarchy;
display, in an interface, an interactive hierarchical tree diagram, wherein the first company, the ultimate parent company, and the other known companies with the same ultimate parent company are displayed as nodes according to parent/child relationships among companies within the corporate hierarchy, wherein the nodes are sized according to a number of shipping records associated with each company of the corporate hierarchy within a specified time frame; and
display, in the interface, adjacent to the tree diagram, a collapsible nested tree list comprising the first company, the ultimate parent company, and the other known companies with the same ultimate parent company according to the parent/child relationships among the companies, wherein the tree diagram and nested tree list have synchronized responses to user input.

11. The system of claim 10, wherein the nodes of the tree diagram provide a visualization of corporate hierarchy in relation to a supply chain within the corporate hierarchy.

12. The system of claim 10, wherein the interface further comprises a user toggle to exclude nodes that do not have supply chain data in the database.

13. The system of claim 10, wherein the interface further comprises a free text search field, and wherein, in response to entry of text in the free text search field, the interface reduces the hierarchical tree diagram and collapsible nested tree list to display only subsidiaries related to the text.

14. The system of claim 10, wherein selection of a company in the nest tree list highlights the selected company in the tree diagram, and selection of a company in the tree diagram highlights the selected company in the nested tree list.

15. The system of claim 10, further comprising, in response to a cursor hovering over a node in the tree diagram, highlighting a path from the node to the ultimate parent company.

16. The system of claim 10, further comprising, in response to a cursor hovering over a node in the tree diagram, displaying a pop-up window with company details.

17. The system of claim 16, wherein the company details comprise at least one of:
company name;
country of operation;
number of shipments; or
a link to a company profile in the database.

18. The system of claim 10, further comprising, in response to a user clicking a node in the tree diagram, expanding a hierarchy sub-branch from the node.

19. A computer program product for visualizing corporate hierarchies, the computer program product comprising:
a computer-readable storage medium having program instructions embodied thereon to perform the steps of:
receiving a selection of a first company stored in a database;
retrieving, from the database, an ultimate parent company of the first company;
retrieving, from the database, all other known companies with the same ultimate parent company as the first company, wherein the ultimate parent company, the first company, and the other known companies form a corporate hierarchy;
displaying, in an interface, an interactive hierarchical tree diagram, wherein the first company, the ultimate parent company, and the other known companies with the same ultimate parent company are displayed as nodes according to parent/child relationships among companies within the corporate hierarchy, wherein the nodes are sized according to a number of shipping records associated with each company of the corporate hierarchy within a specified time frame; and
displaying, in the interface, adjacent to the tree diagram, a collapsible nested tree list comprising the first company, the ultimate parent company, and the other known companies with the same ultimate parent company according to the parent/child relationships among the companies, wherein the tree diagram and nested tree list have synchronized responses to user input.

20. The computer program product of claim 19, wherein the nodes of the tree diagram provide a visualization of corporate hierarchy in relation to a supply chain within the corporate hierarchy.

21. The computer program product of claim 19, wherein the interface further comprises a user toggle to exclude nodes that do not have supply chain data in the database.

22. The computer program product of claim 19, wherein the interface further comprises a free text search field, and wherein, in response to entry of text in the free text search field, the interface reduces the hierarchical tree diagram and collapsible nested tree list to display only subsidiaries related to the text.

23. The computer program product of claim 19, wherein selection of a company in the nest tree list highlights the selected company in the tree diagram, and selection of a company in the tree diagram highlights the selected company in the nested tree list.

24. The computer program product of claim 19, further comprising, in response to a cursor hovering over a node in the tree diagram, highlighting a path from the node to the ultimate parent company.

25. The computer program product of claim 19, further comprising, in response to a cursor hovering over a node in the tree diagram, displaying a pop-up window with company details.

26. The computer program product of claim 25, wherein the company details comprise at least one of:
company name;
country of operation;
number of shipments; or
a link to a company profile in the database.

27. The computer program product of claim 19, further comprising, in response to a user clicking a node in the tree diagram, expanding a hierarchy sub-branch from the node.

28. A computer-implemented method for visualizing corporate hierarchies, the method comprising:
using a number of processors to perform the steps of:
receiving a selection of a profile company stored in a database;
retrieving, from the database, an ultimate parent company of the profile company;
retrieving, from the database, all other known companies with the same ultimate parent company as the profile company, wherein the ultimate parent company, the profile company, and the other known companies form a corporate hierarchy;
displaying, in an interface, an interactive hierarchical tree diagram with the ultimate parent company as root of the tree diagram, wherein the profile company and other companies are displayed as child nodes in the tree diagram, wherein the profile company is highlighted, and wherein node sizes are determined by numbers of shipments associated with each company of the corporate hierarchy within a specified time frame; and
displaying, in the interface, adjacent to the tree diagram, a collapsible nested tree list with the ultimate parent company at top and the profile company and other companies nested according to parent/child relationships among the companies; wherein the tree diagram and nested tree list have synchronized responses to user input.

* * * * *